(12) United States Patent
Oh

(10) Patent No.: US 12,462,865 B2
(45) Date of Patent: Nov. 4, 2025

(54) MULTI STAGE CHARGE PUMP CIRCUITS AND SEMICONDUCTOR MEMORY DEVICES INCLUDING THE SAME

(71) Applicant: Samsung Electronics Co., Ltd., Suwon-si (KR)

(72) Inventor: Jungkyun Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 285 days.

(21) Appl. No.: 18/078,456

(22) Filed: Dec. 9, 2022

(65) Prior Publication Data

US 2023/0343382 A1 Oct. 26, 2023

(30) Foreign Application Priority Data

Apr. 25, 2022 (KR) ........................ 10-2022-0050921

(51) Int. Cl.
| | |
|---|---|
| *G11C 11/40* | (2006.01) |
| *G11C 11/4074* | (2006.01) |
| *G11C 11/4076* | (2006.01) |
| *G11C 11/408* | (2006.01) |
| *H02M 3/07* | (2006.01) |

(52) U.S. Cl.
CPC ...... *G11C 11/4074* (2013.01); *G11C 11/4076* (2013.01); *G11C 11/4085* (2013.01); *G11C 11/4087* (2013.01); *H02M 3/07* (2013.01)

(58) Field of Classification Search
CPC ......... G11C 5/145; H02M 3/073; H02M 3/07; H02M 3/076
See application file for complete search history.

(56) References Cited

U.S. PATENT DOCUMENTS

| | | | | |
|---|---|---|---|---|
| 6,107,864 | A * | 8/2000 | Fukushima | ........... H02M 3/073 |
| | | | | 363/60 |
| 7,098,725 | B2 | 8/2006 | Lee | |
| 7,382,177 | B2 | 6/2008 | Cordoba et al. | |
| 7,741,898 | B2 | 6/2010 | Hsu | |
| 7,760,560 | B2 | 7/2010 | Lee | |

(Continued)

FOREIGN PATENT DOCUMENTS

| | | |
|---|---|---|
| CN | 111181386 A | 5/2020 |
| KR | 10-1999-0066244 A | 8/1999 |

(Continued)

*Primary Examiner* — Uyen Smet
(74) *Attorney, Agent, or Firm* — Wolf, Greenfield & Sacks, P.C.

(57) ABSTRACT

A charge pump circuit of a semiconductor memory device, which may include a first pumping stage that includes a first pumping capacitor and a second pumping capacitor, a first transfer stage that transfers a voltage of the first pumping capacitor when a clock signal is at a high level or transfers a voltage of the second pumping capacitor when a inverse clock signal is at the high level, a second pumping stage that includes a third pumping capacitor and a fourth pumping capacitor, and a second transfer stage that transfers a voltage of the third pumping capacitor when the clock signal is at the high level or transfers a voltage of the fourth pumping capacitor when the inverse clock signal is at the high level. The second transfer stage may output multiple times of the input voltage.

20 Claims, 8 Drawing Sheets

(56) References Cited

U.S. PATENT DOCUMENTS

| | | | |
|---|---|---|---|
| 8,106,703 B2* | 1/2012 | Nagai | H02M 3/073 327/536 |
| 10,033,271 B1 | 7/2018 | Shay et al. | |
| 10,250,133 B2 | 4/2019 | Rana | |
| 11,056,197 B2 | 7/2021 | Min et al. | |
| 2003/0011420 A1 | 1/2003 | Kawai et al. | |
| 2009/0213669 A1* | 8/2009 | Lee | G11C 16/12 365/189.11 |

FOREIGN PATENT DOCUMENTS

| | | |
|---|---|---|
| KR | 100349349 B1 | 8/2002 |
| KR | 100783187 B1 | 12/2007 |
| KR | 10-2021-0040602 A | 4/2021 |

\* cited by examiner

MULTI STAGE CHARGE PUMP CIRCUITS AND SEMICONDUCTOR MEMORY DEVICES INCLUDING THE SAME

CROSS-REFERENCE TO RELATED APPLICATION

This application claims priority under 35 U.S.C. § 119 to Korean Patent Application No. 10-2022-0050921 filed on Apr. 25, 2022, in the Korean Intellectual Property Office, and the entire contents of the above-identified application are incorporated by reference herein.

TECHNICAL FIELD

Aspects of the present disclosure described herein relate to charge pumps, and more particularly, relate to multi-stage charge pump circuits and to semiconductor memory devices including multi-stage charge pump circuits.

BACKGROUND

Semiconductor memory devices may be classified into volatile semiconductor memory devices and non-volatiles semiconductor memory device. A volatile semiconductor memory device may be relatively or comparatively fast in read and write speeds, but loses data stored therein when power is turned off or disconnected therefrom. In contrast, information stored in a non-volatile semiconductor memory device is retained, even when power is turned off or disconnected therefrom. Therefore, the non-volatile semiconductor memory device is used to store information that is to be retained regardless of whether a power is supplied. Semiconductor memory devices have achieved widespread use, with some examples of usages including driving an electronic device, such as a computer or a smartphone, and/or storing data of the electronic device. High-integration technologies for reducing a chip size of the semiconductor memory device and high-capacity technologies for increasing a capacity of the semiconductor memory device are being developed.

In general electronic circuit concepts, it cannot be expected to obtain an output voltage whose potential is higher than that of a power supply voltage without additional circuitry. However, in many cases, a voltage having a potential that is higher than that of the power supply voltage is needed for operation of the semiconductor memory device. For example, in some semiconductor memory devices, voltage drop of a bit line voltage may be caused by a threshold voltage of a cell transistor when a cell capacitor is charged by the bit line voltage. In this case, the above voltage drop can be prevented by driving the gate of the cell transistor with a boosting voltage considerably higher than the power supply voltage. In addition, boosting voltages may be used in a sense amplifier, a data buffer, etc.

In some memory semiconductor devices, a charge pump circuit may supply the boosting voltage. A charge pump circuit is a type of DC-DC converter that may generate a voltage that is higher in level than an input voltage or is lower in level than a ground voltage. The charge pump circuit may use a capacitor as an energy storage element and may include a plurality of switches that are driven by a clock signal.

SUMMARY

Some embodiments of the present disclosure may provide a charge pump circuit that is configured to generate an output voltage corresponding to multiple times an input voltage within one clock cycle.

Some embodiments of the present disclosure may provide a charge pump circuit that prevents or reduces the degradation of a capacitor and secures or improves the reliability by controlling a voltage across a capacitor used in a pumping stage so as to be smaller than or equal to the input voltage.

Some embodiments of the present disclosure may provide a charge pump circuit that uses an area that is smaller than that of a conventional multi-stage boosting circuit, while generating an equal output voltage.

According to some embodiments, a charge pump circuit of a semiconductor memory device includes a first pumping stage that includes a first pumping capacitor including a first end to which a clock signal is applied and a second end connected with a first node, and a second pumping capacitor including a first end to which an inverse clock signal is applied and a second end connected with a second node, a first transfer stage that transfers a voltage of the first node to a third node when the clock signal is at a high level or transfers a voltage of the second node to a fourth node when the inverse clock signal is at the high level, a second pumping stage that includes a third pumping capacitor including a first end connected with the third node and a second end connected with a fifth node, and a fourth pumping capacitor including a first end connected with the fourth node and a second end connected with a sixth node, and a second transfer stage that transfers a voltage of the fifth node to an output node when the clock signal is at the high level or transfers a voltage of the sixth node to the output node when the inverse clock signal is at the high level. When the clock signal is at the high level, the first pumping capacitor and the third pumping capacitor may be electrically connected in series to the output node and may output an output voltage, which corresponds to multiple times an input voltage applied to the first pumping stage and the second pumping stage, to the output node. When the inverse clock signal is at the high level, the second pumping capacitor and the fourth pumping capacitor may be electrically connected in series to the output node and may output the output voltage, which corresponds to multiple times the input voltage, to the output node.

In some embodiments, the first pumping stage may further include a first N-type transistor that includes a gate connected with the second node, a drain configured to receive the input voltage, and a source connected with the first node, and a second N-type transistor that includes a gate connected with the first node, a drain configured to receive the input voltage, and a source connected with the second node.

In some embodiments, the second pumping stage may further include a third N-type transistor that includes a gate configured to receive the inverse clock signal, a drain connected with the third node, a source connected with a ground node, a fourth N-type transistor that includes a gate configured to receive the clock signal, a drain connected with the fourth node, and a source connected with the ground node, a fifth N-type transistor that includes a gate connected with the second node, a drain configured to receive the input voltage, and a source connected with the fifth node, and a sixth N-type transistor that includes a gate connected with the first node, a drain configured to receive the input voltage, and a source connected with the sixth node.

In some embodiments, the first transfer stage may further include a first P-type transistor that includes a gate connected with the second node, a source connected with the first node, and a drain connected with the third node, and a second P-type transistor that includes a gate connected with the first node, a source connected with the second node, and a drain connected with the fourth node.

In some embodiments, the second transfer stage may further include a third P-type transistor that includes a gate connected with the sixth node, a source connected with the fifth node, and a drain connected with the output node, and a fourth P-type transistor that includes a gate connected with the fifth node, a source connected with the sixth node, and a drain connected with the output node.

In some embodiments, when the clock signal is at the high level and the inverse clock signal is at the low level, the first pumping capacitor and the third pumping capacitor may operate in a pumping mode, a voltage level the first node may be boosted to a first voltage corresponding to two times the input voltage through the first pumping capacitor, the first P-type transistor may transfer the first voltage to the third node, a voltage level the fifth node may be boosted to a second voltage corresponding to three times the input voltage through the third pumping capacitor, and the third P-type transistor may transfer the second voltage to the output node.

In some embodiments embodiment, when the clock signal is at the low level and the inverse clock signal is at the high level, the second pumping capacitor and the fourth pumping capacitor operate in a pumping mode, a voltage level of the second node may be boosted to a first voltage corresponding to two times the input voltage through the second pumping capacitor, the second P-type transistor may transfer the first voltage to the fourth node, a voltage level of the sixth node may be boosted to a second voltage corresponding to three times the input voltage through the fourth pumping capacitor, and the fourth P-type transistor may transfer the second voltage to the output node.

In some embodiments, when the clock signal is at the low level and the inverse clock signal is at the high level, the first pumping capacitor and the third pumping capacitor operate in a precharge mode, the first node may be precharged with the input voltage through a first N-type transistor, the third node may be precharged with the input voltage through a third N-type transistor, and the fifth node may be precharged with the input voltage through a fifth N-type transistor.

In some embodiments, when the clock signal is at the high level and the inverse clock signal is at the low level, the second pumping capacitor and the fourth pumping capacitor operate in a precharge mode, the second node may be precharged with the input voltage through a second N-type transistor, the fourth node may be precharged with a ground voltage through a fourth N-type transistor, and the sixth node may be precharged with the input voltage through a sixth N-type transistor.

In some embodiments, the first pumping stage, the first transfer stage, the second pumping stage, and the second transfer stage may operate simultaneously during one clock cycle of the clock signal or the inverse clock signal.

In some embodiments, in a pumping mode or a precharge mode, a voltage difference between opposite ends of each of the first pumping capacitor, the second pumping capacitor, the third pumping capacitor, and the fourth pumping capacitor may be maintained to be smaller than or equal to the input voltage in magnitude.

According to some embodiments, a pump circuit of a semiconductor memory device may include a first pumping stage that includes a first pumping capacitor including a first end configured to receive a clock signal and a second end connected with a first node, and a second pumping capacitor including a first end configured to receive an inverse clock signal and a second end connected with a second node, a first transfer stage that transfers a voltage of the first node to a third node when the clock signal is at a high level or transfers a voltage of the second node to a fourth node when the inverse clock signal is at the high level, a second pumping stage that includes a third pumping capacitor including a first end connected with the third node and a second end connected with a fifth node, and a fourth pumping capacitor including a first end connected with the fourth node and a second end connected with a sixth node, a second transfer stage that transfers a voltage of the fifth node to an output node when the clock signal is at the high level or transfers a voltage of the sixth node to the output node when the inverse clock signal is at the high level, a first sub-pumping circuit that controls a voltage change timing of the second node and the sixth node and a level change timing of the clock signal based on the clock signal, and a second sub-pumping circuit that controls a voltage change timing of the first node and the fifth node and a level change timing of the inverse clock signal based on the inverse clock signal. When the clock signal is at the high level, the first pumping capacitor and the third pumping capacitor may be electrically connected in series to the output node and may output, to the output node, an output voltage that corresponds to multiple times an input voltage applied to the first pumping stage and the second pumping stage. When the inverse clock signal is at the high level, the second pumping capacitor and the fourth pumping capacitor may be electrically connected in series to the output node and may output, to the output node, the output voltage that corresponds to multiple times the input voltage.

In some embodiments, the first pumping stage may further include a first N-type transistor and a second N-type transistor, the second pumping stage may further include a third N-type transistor, a fourth N-type transistor, a fifth N-type transistor, and a sixth N-type transistor, the first sub-pumping circuit may include a first control logic, a first sub-capacitor, a first N-type sub-transistor, and a second N-type sub-transistor, and the second sub-pumping circuit may include a second control logic, a second sub-capacitor, a third N-type sub-transistor, and a fourth N-type sub-transistor. A source of the first N-type transistor may be connected with the first node, a source of the second N-type transistor may be connected with the second node, a drain of the third N-type transistor may be connected with the third node, a drain of the fourth N-type transistor may be connected with the fourth node, a source of the fifth N-type transistor may be connected with the fifth node, a source of the sixth N-type transistor may be connected with the sixth node, and a first end of the first control logic may be connected with a seventh node. A gate of the second N-type transistor, a gate of the sixth N-type transistor, a first end of the first sub-capacitor, a source of the first N-type sub-transistor, a source of the second N-type sub-transistor, and a gate of the fourth N-type sub-transistor may be connected with an eighth node. A first end of the second control logic may be connected with a ninth node. A gate of the first N-type transistor, a gate of the fifth N-type transistor, a first end of the second sub-capacitor, a source of the third N-type sub-transistor, a source of the fourth N-type sub-transistor, and a gate of the second N-type sub-transistor may be connected with a tenth node. A second end of the first control logic may be connected with a second end of the first sub-capacitor, a second end of the second control logic may be connected with a second end of the second sub-capacitor, a source of the third N-type transistor and a source of the fourth N-type transistor may be connected with a ground node, and the input voltage may be applied to a drain of the first N-type transistor, a drain of the second N-type transistor, a drain of the fifth N-type transistor, and a drain of the sixth N-type transistor.

In some embodiments, the first control logic may be configured to delay the clock signal and may be configured to output the delayed clock signal to the first sub-capacitor, and the second control logic may be configured to delay the inverse clock signal and may be configured to output the delayed inverse clock signal to the second sub-capacitor.

In an embodiment, in a precharge mode, the first sub-pumping circuit may control the second N-type transistor and the sixth N-type transistor such that potentials of the second node and the sixth node are maintained independently of the inverse clock signal.

In some embodiments, the first sub-pumping circuit may be configured to control the second N-type transistor and the sixth N-type transistor such that potential of the second node and the sixth node are maintained at the input voltage to be different from a timing at which the second pumping capacitor and the fourth pumping capacitor switches from a precharge mode to a pumping mode.

In some embodiments, in a precharge mode, the second sub-pumping circuit may be configured to control the first N-type transistor and the fifth N-type transistor such that potentials of the first node and the fifth node are maintained independently of the clock signal.

In some embodiments, the second sub-pumping circuit may be configured to control the first N-type transistor and the fifth N-type transistor such that potential of the first node and the fifth node are maintained at the input voltage to be different from a timing at which the first pumping capacitor and the third pumping capacitor switches from a precharge mode to a pumping mode.

According to some embodiments, a semiconductor memory device may include a memory cell array that includes a plurality of memory cells, a peripheral circuit that receives a clock signal, a first power supply voltage, and a second power supply voltage that higher than the first power supply voltage from an external source and reads/writes data from/in the memory cell array based on the clock signal, the first power supply voltage, and the second power supply voltage, and a charge pump circuit that generates an internal high voltage corresponding to multiple times the second power supply voltage. The charge pump circuit may include a first pumping stage that includes a first pumping capacitor including a first end configured to receive the clock signal and a second end connected with a first node, and a second pumping capacitor including a first end configured to receive an inverse clock signal generated by the peripheral circuit and a second end connected with a second node, a first transfer stage that transfers a voltage of the first node to a third node when the clock signal is at a high level or transfers a voltage of the second node to a fourth node when the inverse clock signal is at the high level, a second pumping stage that includes a third pumping capacitor including a first end connected with the third node and a second end connected with a fifth node, and a fourth pumping capacitor including a first end connected with the fourth node and a second end connected with a sixth node, and a second transfer stage that transfers a voltage of the fifth node to an output node when the clock signal is at the high level or transfers a voltage of the sixth node to the output node when the inverse clock signal is at the high level. When the clock signal is at the high level, the first pumping capacitor and the third pumping capacitor may be electrically connected in series to the output node and may output, to the output node, an output voltage that corresponds to multiple times the second power supply voltage applied to the first pumping stage and the second pumping stage. When the inverse clock signal is at the high level, the second pumping capacitor and the fourth pumping capacitor may be electrically connected in series to the output node and may output, to the output node, the output voltage that corresponds to multiple times the second power supply voltage.

In some embodiments, the peripheral circuit may include an address decoder that provides the memory cell array with a word line enable voltage used to select a word line, an input/output circuit that is connected with the memory cell array through bit lines and inputs the data to the memory cell array through the bit lines or outputs the data transferred through the bit lines to an external destination, and control logic that provides the clock signal and the second power supply voltage to the charge pump circuit, generates the inverse clock signal, and controls the address decoder and the input/output circuit such that the data are input to the memory cell array or the data are output to the external destination, and the control logic may control the charge pump circuit such that the word line enable voltage corresponding to multiple times the second power supply voltage is generated for each operation mode.

BRIEF DESCRIPTION OF THE FIGURES

The above and other objects and features of the present disclosure will become apparent by describing in detail some examples of embodiments thereof with reference to the accompanying drawings.

DETAILED DESCRIPTION

Below, some examples of embodiments of the present disclosure will be described in detail and with sufficient clarity to permit those having ordinary skill in the art to implement the inventive concepts disclosed herein.

Figure 1:
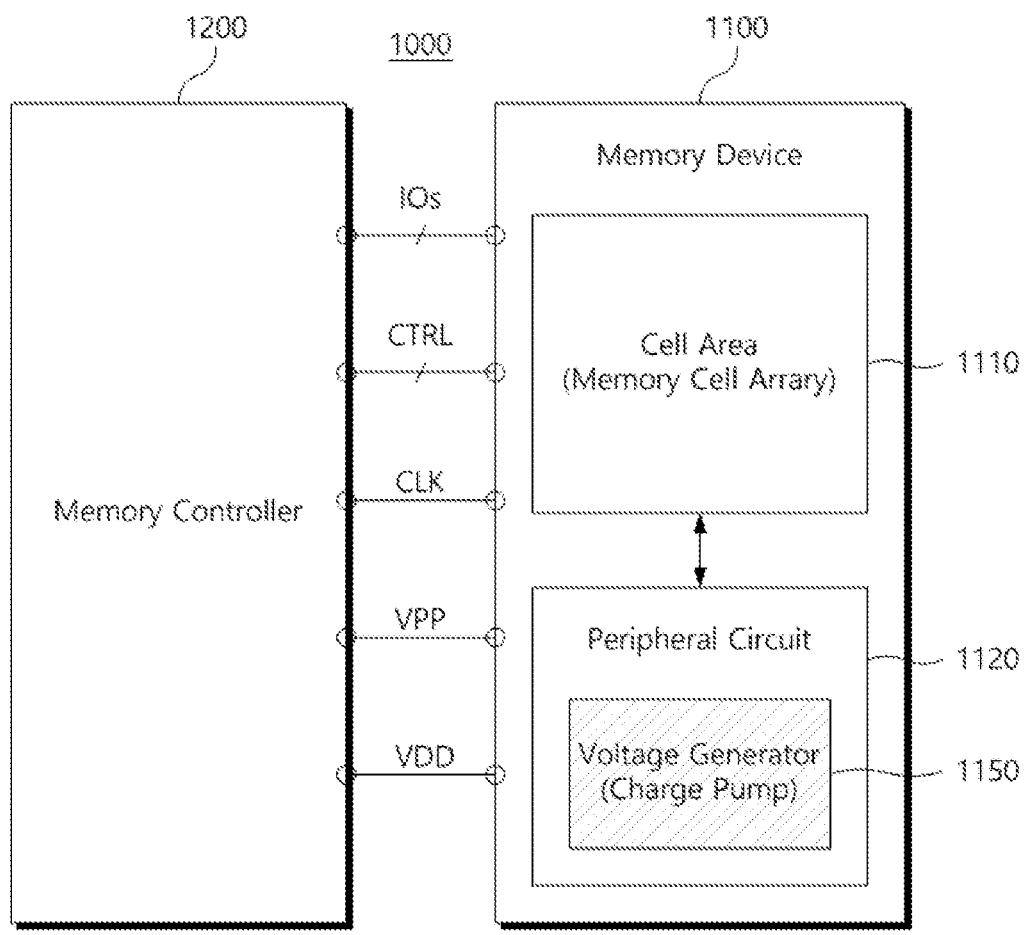
FIG. 1 is a block diagram illustrating a data storage device according to some embodiments.

FIG. 1 is a block diagram illustrating a data storage device according to some embodiments. Referring to FIG. 1, a data storage device 1000 includes a semiconductor memory device 1100 and a memory controller 1200. The semiconductor memory device 1100 and the memory controller 1200 may be connected through one or more data input/output lines IOs, one or more control lines CTRL, a clock signal line CLK, and power lines VDD and VPP. Under control of the memory controller 1200, the data storage device 1000 may store data in the semiconductor memory device 1100.

According to some embodiments, the semiconductor memory device 1100 may include a memory cell area 1110 and a peripheral circuit area 1120. The memory cell area 1110 includes a memory cell array. The memory cell array may include a plurality of memory cells, and one or more data (or data bits) may be stored in each memory cell.

According to some embodiments, the peripheral circuit area 1120 may receive a command, an address, and data from the memory controller 1200, and may store the data in the memory cell area 1110 through an internal operation. Also, the peripheral circuit area 1120 may read data stored in the memory cell area 1110 and may provide the read data to the memory controller 1200. The peripheral circuit area 1120 may receive an external power through the power lines VDD and VPP, and may generate an internal power used in internal operations, such as read operations or write operations.

According to some embodiments, the peripheral circuit area 1120 may include a voltage generator 1150 configured to generate internal power signals of various levels. The voltage generator 1150 may include a capacitor and a transistor. In some embodiments, and as described in greater detail herein, the charge pump included in the voltage generator 1150 may be implemented to have a cross-coupled charge pump structure and a double boost operation pump structure. According to some embodiments of the present disclosure, the chip size of the semiconductor memory device 1100 may be reduced, and/or the circuit characteristic of the semiconductor memory device 1100 may be improved.

Figure 2:
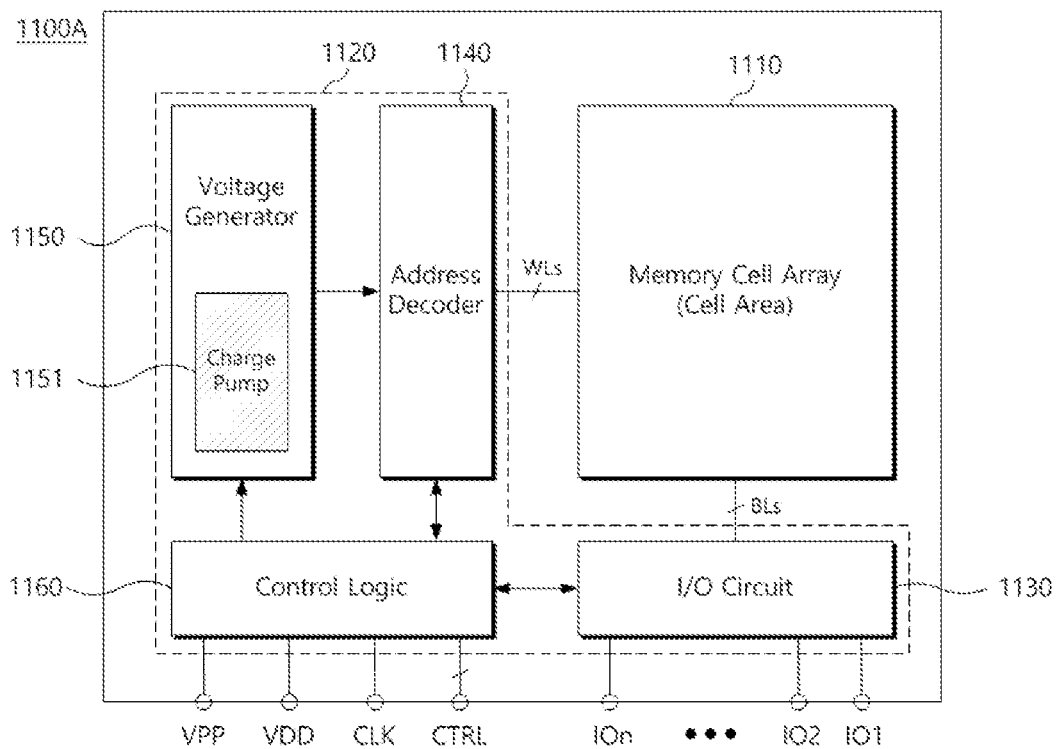
FIG. 2 is a block diagram illustrating a semiconductor memory device illustrated in FIG. 1.

FIG. 2 is a block diagram illustrating a semiconductor memory device illustrated in FIG. 1. A DRAM 1100A is illustrated in FIG. 2 as an example. Referring to FIG. 2, the DRAM 1100A may include the memory cell array 1110 and the peripheral circuit area 1120. The peripheral circuit area 1120 may include an input/output circuit 1130, an address decoder 1140, the voltage generator 1150, and control logic 1160.

According to some embodiments, the memory cell area 1110 may include a plurality of memory cells, and one or more data (or data bits) may be stored in each memory cell. The memory cell area 1110 may perform internal operations, in which data are read and/or written through bit lines BLs, based on a word line enable voltage received from the address decoder 1140. The word line enable voltage may be provided to the plurality of memory cells through word lines WLs.

According to some embodiments, the input/output circuit 1130 may be connected internally with the memory cell array 1110 through the bit lines BLs and may be connected externally with the memory controller 1200 (refer to FIG. 1) through input/output lines I/O. The input/output circuit 1130 may be provided with write data from the memory controller 1200 in the write operation and may provide read data to the memory controller 1200 in the read operation. The input/output circuit 1130 may receive and output data under control of the control logic 1160.

According to some embodiments, the address decoder 1140 may provide the word line enable voltage (e.g., a write voltage or a read voltage) to a selected word line WL under control of the control logic 1160. The address decoder 1140 may be provided with the word line enable voltage, which may be used to select the word line WL of the memory cell area 1110. The address decoder 1140 may be provided with the word line enable voltage from the voltage generator 1150. The address decoder 1140 may provide the memory cell area 1110 with the word line enable voltage whose magnitude (or level) is variously set for respective operation modes (e.g., a read mode, a write mode, a refresh mode, and a test mode). The address decoder 1140 may be supplied with at least one word line enable voltage from the voltage generator 1150.

According to some embodiments, the voltage generator 1150 may receive a core power supply voltage VPP from the control logic 1160 and may generate at least one word line enable voltage that may be used to read or write data under control of the control logic 1160. The voltage generator 1150 may generate voltages higher in level than the core power supply voltage VPP used in the DRAM 1100A. For example, the voltage generator 1150 may include a charge pump 1151 configured to generate voltages higher in level than the core power supply voltage VPP. The charge pump 1151 may generate a voltage (e.g., a voltage whose level is multiple times the level of the core power supply voltage VPP) higher in level than the core power supply voltage VPP based on the core power supply voltage VPP. The core power supply voltage VPP may be used as an input voltage Vin (refer to FIG. 3) that is input to the charge pump 1151. The charge pump 1151 may generate the word line enable voltage for each operation mode, based on a clock signal CLK and an inverse clock signal provided from the control logic 1160. Also, the voltage generator 1150 may generate voltages that are higher in level than the core power supply voltage VPP that may be used in the operation of the peripheral circuit area 1120.

According to some embodiments, the control logic 1160 may be supplied from the memory controller 1200 with a control signal CTRL (e.g., a command, an address, or any other control signal), the clock signal CLK, a device supply voltage VDD (e.g., 1.1 V), and the core power supply voltage VPP (e.g., 1.8 V) that is higher in level than the device supply voltage VDD. The control logic 1160 may provide the device supply voltage VDD (e.g., a first power supply voltage) for the operation of the peripheral circuit area 1120 (e.g., the input/output circuit 1130, the address decoder 1140, and the voltage generator 1150). The control logic 1160 may control the write, read, and delete operations of the DRAM 1100A by using the clock signal CLK and the control signal CTRL. The control logic 1160 may generate the inverse clock signal based on the clock signal CLK. The control logic 1160 may provide the core power supply voltage VPP (e.g., a second power supply voltage), the clock signal CLK, and the inverse clock signal to the voltage generator 1150 (or the charge pump 1151).

Figure 3:
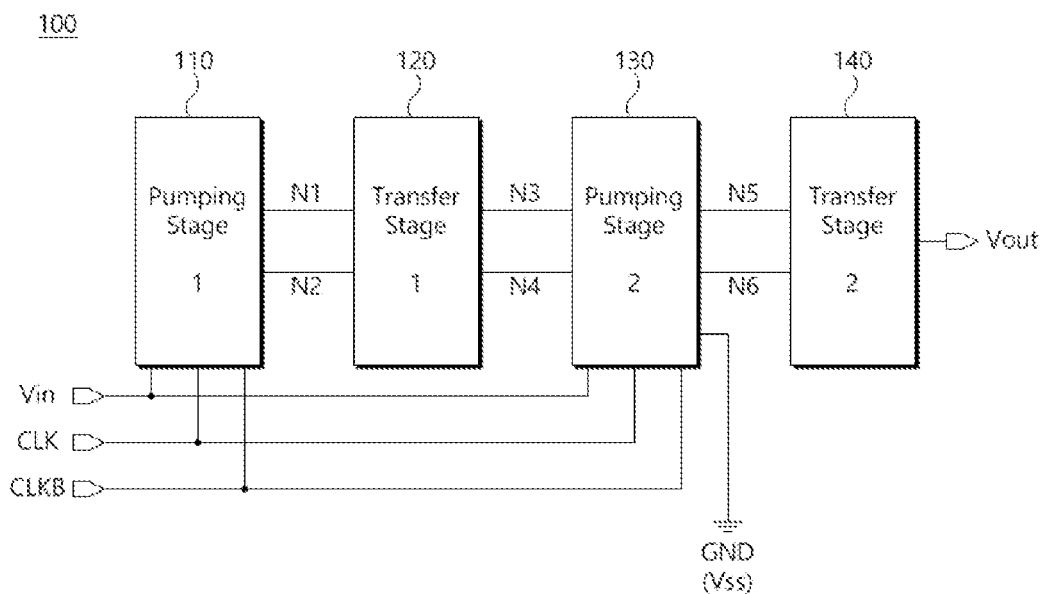
FIG. 3 is a block diagram illustrating a charge pump circuit according to some embodiments.

FIG. 3 is a block diagram illustrating a charge pump circuit according to some embodiments. Referring to FIG. 3, a charge pump circuit 100 may correspond to the voltage generator 1150 of FIG. 1 or the charge pump 1151 of FIG. 2. The charge pump circuit 100 may generate an output voltage Vout (e.g., an internal high voltage or the word line enable voltage of the semiconductor memory device 1100 of FIG. 1 or the DRAM 1100A of FIG. 2) that is a relatively higher voltage based on the input voltage Vin (e.g., the core power supply voltage VPP of FIG. 1 or 2) that is a relatively lower voltage. The charge pump circuit 100 may include a plurality of stages.

According to some embodiments, the charge pump circuit 100 may include a first pumping stage 110, a first transfer stage 120, a second pumping stage 130, and a second transfer stage 140. However, the present disclosure is not limited thereto. For example, the charge pump circuit 100 may further include an additional pumping stage and an additional transfer stage at the back of the second transfer stage 140 depending on the target output voltage Vout, as described with reference to FIG. 11. The additional pumping stage and the additional transfer stage may include the same configurations as the second pumping stage 130 and the second transfer stage 140. The charge pump circuit 100 may generate the output voltage Vout corresponding to multiple times the input voltage Vin. Below, for convenience of description, it is assumed that the charge pump circuit 100 generates the output voltage Vout corresponding to three times the input voltage Vin and the charge pump circuit 100 includes the first pumping stage 110, the first transfer stage 120, the second pumping stage 130, and the second transfer stage 140.

According to some embodiments, the first pumping stage 110 may be connected with the first transfer stage 120 through a first node N1 and a second node N2. The first transfer stage 120 may be connected with the second pumping stage 130 through a third node N3 and a fourth node N4. The second pumping stage 130 may be connected with the second transfer stage 140 through a fifth node N5 and a sixth node N6. The input voltage Vin may be applied to the first pumping stage 110 and the second pumping stage 130. The clock signal CLK may be applied to the first pumping stage 110 and the second pumping stage 130. An inverse clock signal CLKB may be applied to the first pumping stage 110 and the second pumping stage 130. The second pumping stage 130 may be connected with a ground node GND. The output voltage Vout may be output through the second transfer stage 140.

According to some embodiments, based on the clock signal CLK and the inverse clock signal CLKB, a first part of the charge pump circuit 100 may operate in a precharge mode, and a second part of the charge pump circuit 100 may operate in a pumping mode. For example, when the clock signal CLK is at the high level and the inverse clock signal CLKB is at the low level, elements (or components) connected with the first node N1, the third node N3, and the fifth node N5 may operate in the pumping mode, and elements (or components) connected with the second node N2, the fourth node N4, and the sixth node N6 may operate in the precharge mode. When the clock signal CLK is at the low level and the inverse clock signal CLKB is at the high level, the elements (or components) connected with the first node N1, the third node N3, and the fifth node N5 may operate in the precharge mode, and the elements (or components) connected with the second node N2, the fourth node N4, and the sixth node N6 may operate in the pumping mode. According to the above description, the elements (or components) connected with the first node N1, the third node N3, and the fifth node N5 may operate complementarily with the elements (or components) connected with the second node N2, the fourth node N4, and the sixth node N6, and thus, the output voltage Vout may be uniformly output.

According to some embodiments, the charge pump circuit 100 may generate the output voltage Vout corresponding to multiple times the input voltage Vin. For example, in the case of the precharge mode, the first node N1 or the second node N2 may be precharged with the input voltage Vin. In the case of the precharge mode, the third node N3 or the fourth node N4 may be precharged with a ground voltage Vss. In the case of the precharge mode, the fifth node N5 or the sixth node N6 may be precharged with the input voltage Vin. In the case of the pumping mode, the first node N1 or the second node N2 may be boosted to two times the input voltage 2Vin. In the case of the pumping mode, the third node N3 or the fourth node N4 may be boosted to two times the input voltage 2Vin. In the case of the pumping mode, the fifth node N5 or the sixth node N6 may be boosted to three times the input voltage 3Vin.

According to some embodiments, in the pumping mode, the first pumping stage 110 may boost a voltage (or the input voltage Vin) of an input node as much as the input voltage Vin. The first transfer stage 120 may transfer the voltage of the first node N1 or the second node N2 to the third node N3 or the fourth node N4. The second pumping stage 130 may boost the voltage of the third node N3 or the fourth node N4 as much as the input voltage Vin. The second transfer stage 140 may transfer the voltage of the fifth node N5 or the sixth node N6 to an output node.

According to some embodiments, the first pumping stage 110, the first transfer stage 120, the second pumping stage 130, and the second transfer stage 140 may simultaneously operate during one clock cycle, and the output voltage Vout may be boosted to a target voltage (e.g., a high voltage corresponding to multiple times the input voltage Vin) only in one clock cycle.

Figure 4:
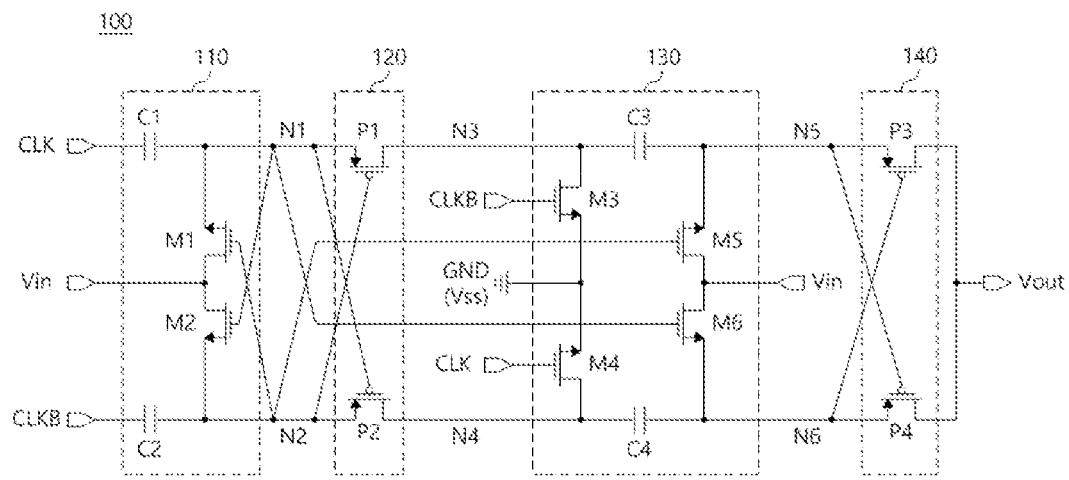
FIG. 4 is a circuit diagram illustrating a charge pump circuit of FIG. 3.

FIG. 4 is a circuit diagram illustrating a charge pump circuit of FIG. 3. Referring to FIG. 4, the charge pump circuit 100 may include the first pumping stage 110, the first transfer stage 120, the second pumping stage 130, and the second transfer stage 140. The charge pump circuit 100 may boost the input voltage Vin based on the clock signal CLK and the inverse clock signal CLKB and may generate the output voltage Vout that is a relatively higher voltage than the input voltage Vin.

According to some embodiments, the first pumping stage 110 may include a first pumping capacitor C1, a second pumping capacitor C2, a first N-type (or NMOS) transistor M1, and a second N-type transistor M2. The first transfer stage 120 may include a first P-type (or PMOS) transistor P1 and a second P-type transistor P2. The second pumping stage 130 may include a third pumping capacitor C3, a fourth pumping capacitor C4, a third N-type transistor M3, a fourth N-type transistor M4, a fifth N-type transistor M5, and a sixth N-type transistor M6. The second transfer stage 140 may include a third P-type transistor P3 and a fourth P-type transistor P4. The first pumping stage 110 and the first transfer stage 120 may be connected with each other through the first node N1 and the second node N2. The first transfer stage 120 and the second pumping stage 130 may be connected with each other through the third node N3 and the fourth node N4. The second pumping stage 130 and the second transfer stage 140 may be connected with each other through the fifth node N5 and the sixth node N6.

According to some embodiments, the first pumping capacitor C1 may include a first end to which the clock signal CLK is applied and a second end connected with the first node N1. The second pumping capacitor C2 may include a first end to which the inverse clock signal CLKB is applied and a second end connected with the second node N2. As an example, the inverse clock signal CLKB may be an inverted version of the clock signal CLK. The first N-type transistor M1 may include a gate connected with the second node N2, a drain to which the input voltage Vin is applied, and a source connected with the first node N1. The second N-type transistor M2 may include a gate connected with the first node N1, a drain to which the input voltage Vin is applied, and a source connected with the second node N2. The first P-type transistor P1 may include a gate connected with the second node N2, a source connected with the first node N1, and a drain connected with the third node N3. The second P-type transistor P2 may include a gate connected with the first node N1, a source connected with the second node N2, and a drain connected with the fourth node N4.

According to some embodiments, the third pumping capacitor C3 may include a first end connected with the third node N3 and a second end connected with the fifth node N5. The fourth pumping capacitor C4 may include a first end connected with the fourth node N4 and a second end connected with the sixth node N6. The third N-type transistor M3 may include a gate to which the inverse clock signal CLKB is applied, a drain connected with the third node N3, and a source connected with the ground node GND. The fourth N-type transistor M4 may include a gate to which the clock signal CLK is applied, a drain connected with the fourth node N4, and a source connected with the ground node GND. The fifth N-type transistor M5 may include a gate connected with the second node N2, a drain to which the input voltage Vin is applied, and a source connected with the fifth node N5. The sixth N-type transistor M6 may include a gate connected with the first node N1, a drain to which the input voltage Vin is applied, and a source connected with the sixth node N6. The third P-type transistor P3 may include a gate connected with the sixth node N6, a source connected with the fifth node N5, and a drain connected with the output node. The fourth P-type transistor P4 may include a gate connected with the fifth node N5, a source connected with the sixth node N6, and a drain connected with the output node.

According to some embodiments, the charge pump circuit 100 may include a cross-coupled structure. A first part and a second part of the charge pump circuit 100 may perform complementary operations. When the first pumping capacitor C1 and the third pumping capacitor C3 operate in the pumping mode, the second pumping capacitor C2 and the fourth pumping capacitor C4 may operate in the precharge mode. Alternatively, when the first pumping capacitor C1 and the third pumping capacitor C3 operate in the precharge mode, the second pumping capacitor C2 and the fourth pumping capacitor C4 may operate in the pumping mode. As an example, in an initial mode where the clock signal CLK and the inverse clock signal CLKB are not applied, the first node N1, the second node N2, the fifth node N5, and the sixth node N6 may be set to the input voltage Vin, and the third node N3 and the fourth node N4 may be set to the ground voltage Vss. The operation of the charge pump circuit 100 will be described in greater detail with reference to FIGS. 5 and 6.

According to some embodiments, the area (or size) of the charge pump circuit 100 may be smaller than that of a conventional cross-coupled charge pump circuit. For example, the conventional cross-coupled charge pump circuit has a structure where one pumping stage and one charging stage are repeated to increase a voltage. Each of the repeated pumping stages may include, in general, two pumping capacitors, two N-type transistors, and two P-type transistors. Each of the repeated charging stages may include two charging capacitors. According to the above description, to generate an output voltage corresponding to three times the input voltage Vin, the conventional cross-coupled charge pump circuit may include two pumping stages and one charging stage, that is, may include six capacitors, four N-type transistors, and four P-type transistors. In contrast, to generate an output voltage corresponding to three times the input voltage Vin, the charge pump circuit 100 may be composed of four capacitors, six N-type transistors, and four P-type transistors. In general, because the area occupied by a capacitor is larger than the area occupied by a transistor, the area (or size) of the charge pump circuit 100 may be smaller than that of the conventional cross-coupled charge pump circuit.

Also, in the conventional cross-coupled charge pump circuit where a pumping capacitor and a charging capacitor are connected in parallel, as the number of stages increases, a required capacity of a charging capacitor becomes greater. As such, in the conventional cross-coupled charge pump circuit, as the number of stages increases, the area of the capacitor may become larger. In contrast, according to some embodiments of the present inventive concepts, a charging capacitor whose capacity is the same as that of the first stage may be used in all the stages of the charge pump circuit 100. The reason is that a voltage across each charging capacitor (e.g., the first pumping capacitor C1, the second pumping capacitor C2, the third pumping capacitor C3, and the fourth pumping capacitor C4) of the charge pump circuit 100 is smaller than or equal to the input voltage Vin. Accordingly, the area of the charge pump circuit 100 may be smaller than that of the conventional cross-coupled charge pump circuit.

As described above, as the charge pump circuit 100 of the present disclosure may be implemented with a double boost charge pump of a cross-coupled structure, the charge pump circuit 100 may be simplified, and the area of the charge pump circuit 100 may be minimized. As the charge pump circuit 100 is implemented with the double boost charge pump, a normal operation of the charge pump circuit 100 may be possible from a low voltage (e.g., 1.1 V), and the charge pump circuit 100 may operate with relatively high efficiency regardless of a used voltage. As the charge pump circuit 100 operates in two phases (e.g., precharge and transfer) from the input to the output, the pumping loss may be minimized, and relatively high pumping efficiency may be maintained. Also, because a voltage across each capacitor included in the charge pump circuit 100 does not exceed an input voltage, the reliability of the charge pump circuit 100 may be improved, and the number of capacitors per unit area may increase. In addition, compared to the conventional multi-stage cross-coupled charge pump, the charge pump circuit 100 may output a pumped voltage only in one clock cycle, and the number of transistors that are used in the charge pump circuit 100 may decrease, the overall area of the charge pump circuit 100 may decrease.

Figure 5:
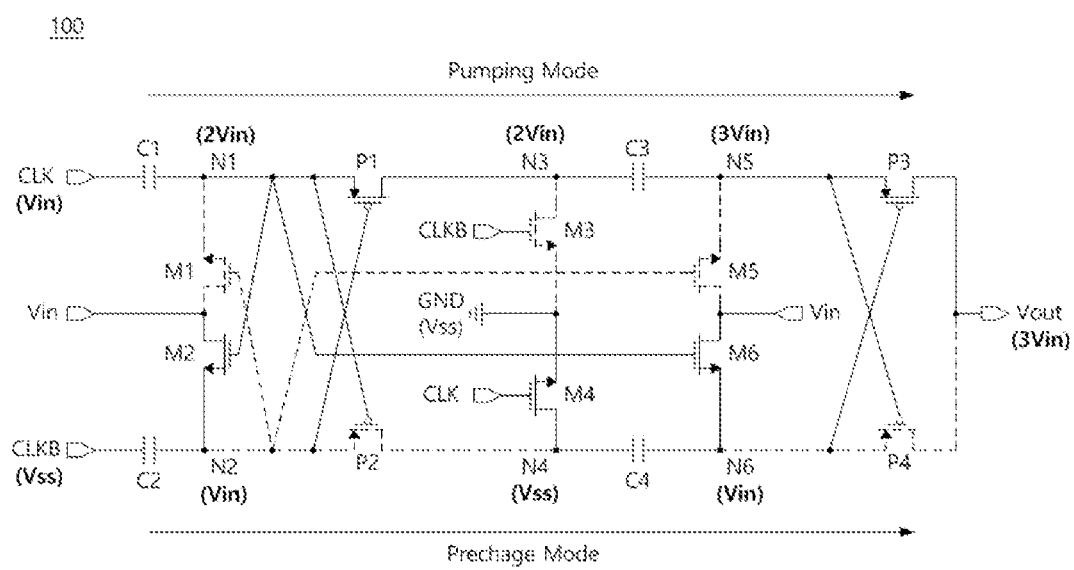
FIG. 5 is a diagram illustrating an operation of a charge pump circuit of FIG. 4 when a clock signal of a high level and an inverse clock signal of a low level are applied thereto.

FIG. 5 is a diagram illustrating an operation of a charge pump circuit of FIG. 4 when a clock signal of a high level and an inverse clock signal of a low level are applied thereto. Referring to FIG. 5, in the first case where the clock signal CLK is at the high level and the inverse clock signal CLKB is at the low level, the first N-type transistor M1, the second P-type transistor P2, the third N-type transistor M3, the fifth N-type transistor M5, and the fourth P-type transistor P4 may be turned off, and the second N-type transistor M2, the first P-type transistor P1, the fourth N-type transistor M4, the sixth N-type transistor M6, and the third P-type transistor P3 may be turned on. In the first case, the first pumping capacitor C1 and the third pumping capacitor C3 may operate in the pumping mode, and the second pumping capacitor C2 and the fourth pumping capacitor C4 may operate in the precharge mode.

According to some embodiments, in the first case, the first pumping capacitor C1 and the third pumping capacitor C3 that operate in the pumping mode may be connected in series to the output node. For example, the first pumping capacitor C1 and the third pumping capacitor C3 may be connected in series through the first P-type transistor P1 and the third P-type transistor P3 that are turned on. According to the above description, the voltage of the first node N1 may increase to two times the input voltage 2Vin through the first pumping capacitor C1, the voltage 2Vin of the first node N1 may be transferred to the third node N3 through the first P-type transistor P1, the voltage of the fifth node N5 may increase to three times the input voltage 3Vin through the third pumping capacitor C3, and the voltage 3Vin of the fifth node N5 may be output as the output voltage Vout through the third P-type transistor P3.

According to some embodiments, in the first case, the second pumping capacitor C2 and the fourth pumping capacitor C4 that operate in the precharge mode may be precharged with the input voltage Vin. For example, the inverse clock signal CLKB of the low level may be applied to the first end of the second pumping capacitor C2, and the second node N2 may be precharged with the input voltage Vin through the second N-type transistor M2. The fourth node N4 may be precharged with the ground voltage Vss through the fourth N-type transistor M4. The sixth node N6 may be precharged with the input voltage Vin through the sixth N-type transistor M6. As such, each of the second pumping capacitor C2 and the fourth pumping capacitor C4 may be charged with the input voltage Vin.

Figure 6:
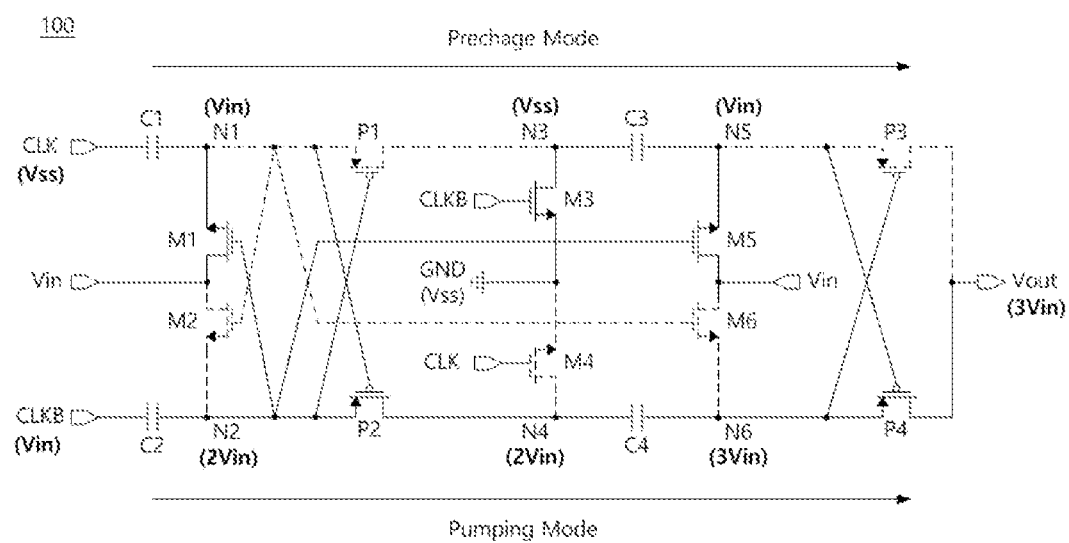
FIG. 6 is a diagram illustrating an operation of a charge pump circuit of FIG. 4 when a clock signal of a low level and an inverse clock signal of a high level are applied thereto.

FIG. 6 is a diagram illustrating an operation of a charge pump circuit of FIG. 4 when a clock signal of a low level and an inverse clock signal of a high level are applied thereto. Referring to FIG. 6, in the second case where the clock signal CLK is at the low level and the inverse clock signal CLKB is at the high level, the first N-type transistor M1, the second P-type transistor P2, the third N-type transistor M3, the fifth N-type transistor M5, and the fourth P-type transistor P4 may be turned on, and the second N-type transistor M2, the first P-type transistor P1, the fourth N-type transistor M4, the sixth N-type transistor M6, and the third P-type transistor P3 may be turned off. In the second case, the first pumping capacitor C1 and the third pumping capacitor C3 may operate in the precharge mode, and the second pumping capacitor C2 and the fourth pumping capacitor C4 may operate in the pumping mode.

According to some embodiments, in the second case, the second pumping capacitor C2 and the fourth pumping capacitor C4 that operate in the pumping mode may be connected in series to the output node. For example, the second pumping capacitor C2 and the fourth pumping capacitor C4 may be connected in series through the second P-type transistor P2 and the fourth P-type transistor P4 that are turned on. According to the above description, the voltage of the second node N2 may increase to two times the input voltage 2Vin through the second pumping capacitor C2, the voltage 2Vin of the second node N2 may be transferred to the fourth node N4 through the second P-type transistor P2, the voltage of the sixth node N6 may increase to three times the input voltage 3Vin through the fourth pumping capacitor C4, and the voltage 3Vin of the sixth node N6 may be output as the output voltage Vout through the fourth P-type transistor P4.

According to some embodiments, in the second case, the first pumping capacitor C1 and the third pumping capacitor C3 that operate in the precharge mode may be precharged with the input voltage Vin. For example, the clock signal CLK of the low level may be applied to the first end of the first pumping capacitor C1, and the first node N1 may be precharged with the input voltage Vin through the first N-type transistor M1. The third node N3 may be precharged with the ground voltage Vss through the third N-type transistor M3. The fifth node N5 may be precharged with the input voltage Vin through the fifth N-type transistor M5. As such, each of the first pumping capacitor C1 and the third pumping capacitor C3 may be charged with the input voltage Vin.

Referring to FIGS. 5 and 6, the first pumping stage 110, the first transfer stage 120, the second pumping stage 130, and the second transfer stage 140 may simultaneously operate during one clock cycle and may generate the output voltage Vout corresponding to multiple times (e.g., three times) the input voltage Vin. Accordingly, the charge pump circuit 100 may generate relatively quickly the output voltage Vout that is the relatively high voltage; in addition, the voltage loss that occurs when the charge pump circuit 100 generates the output voltage Vout may decrease compared to a manner where a plurality of stages sequentially operate to output a high voltage. Also, in the pumping mode and the precharge mode, a voltage across each pumping capacitor (e.g., each of the first pumping capacitor C1, the second pumping capacitor C2, the third pumping capacitor C3, and the fourth pumping capacitor C4) may be smaller than or equal to the input voltage Vin regardless of the increase in the number of pumping stages. Accordingly, the degradation of each pumping capacitor may be prevented or reduced. This may mean that the reliability of the charge pump circuit 100 is improved.

Figure 7:
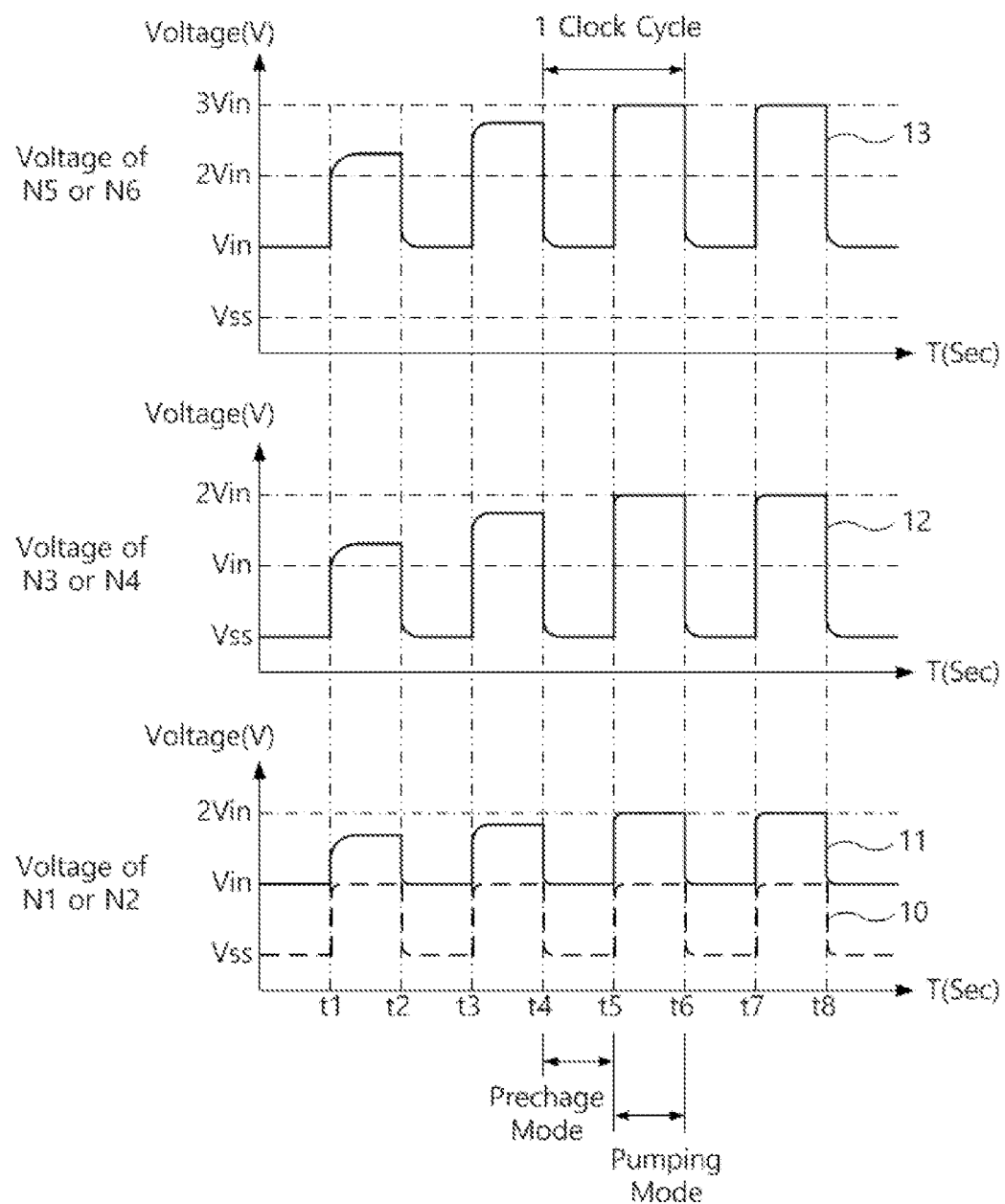
FIG. 7 is a timing diagram illustrating a voltage change of each node in a charge pump circuit of FIG. 4.

FIG. 7 is a timing diagram illustrating a voltage change of each node in a charge pump circuit of FIG. 4. Referring to FIGS. 4 to 7, a clock graph 10 may indicate the clock signal CLK and the inverse clock signal CLKB. A first graph 11 may indicate a voltage of the first node N1 or the second node N2. A second graph 12 may indicate a voltage of the third node N3 or the fourth node N4. A third graph 13 may indicate a voltage of the fifth node N5 or the sixth node N6. As an example, when the clock graph 10 indicates the clock signal CLK, the first graph 11 may indicate the voltage of the first node N1, the second graph 12 may indicate the voltage of the third node N3, and the third graph 13 may indicate the voltage of the fifth node N5. Alternatively, when the clock graph 10 indicates the inverse clock signal CLKB, the first graph 11 may indicate the voltage of the second node N2, the second graph 12 may indicate the voltage of the fourth node N4, and the third graph 13 may indicate the voltage of the sixth node N6. One clock cycle of the clock signal CLK or the inverse clock signal CLKB may progress between two time points (e.g., between a first time point t1 and a third time point t3, between a second time point t2 and a fourth time point t4, between the third time point t3 and a fifth time point t5, between the fourth time point t4 and a sixth time point t6, between the fifth time point t5 and a seventh time point t7, or between the sixth time point t6 and an eighth time point t8).

According to some embodiments, some of the nodes of the charge pump circuit 100 may be precharged during one clock cycle, and the others of the nodes of the charge pump circuit 100 may be pumped. Accordingly, without needing to wait until an output voltage that is a relatively high voltage is output by sequentially passing through stages, the charge pump circuit 100 may output a voltage (e.g., 3Vin) corresponding to multiple times the input voltage Vin through one clock cycle. As an example, when the clock graph 10 indicates the clock signal CLK, between the fourth time point t4 and the fifth time point t5, the first node N1, the third node N3, and the fifth node N5 may operate in the precharge mode. Also, between the fifth time point t5 and the sixth time point t6, the first node N1, the third node N3, and the fifth node N5 may operate in the pumping mode. As another example, when the clock graph 10 indicates the inverse clock signal CLKB, between the fourth time point t4 and the fifth time point t5, the second node N2, the fourth node N4, and the sixth node N6 may operate in the precharge mode. Also, between the fifth time point t5 and the sixth time point t6, the second node N2, the fourth node N4, and the sixth node N6 may operate in the pumping mode.

According to some embodiments, each node of the charge pump circuit 100 may reach a steady state (e.g., a theoretical value) after a given time (e.g., after the fourth time point t4). A time taken to reach the steady state may be caused by the coupling between a parasitic capacitance of an NMOS transistor and a capacitance of a pumping capacitor. However, in the charge pump circuit 100, the pumping operation may be simultaneously performed with respect to all the pumping capacitors during one clock cycle, and thus, a time taken to reach the steady state may be shortened.

Figure 8:
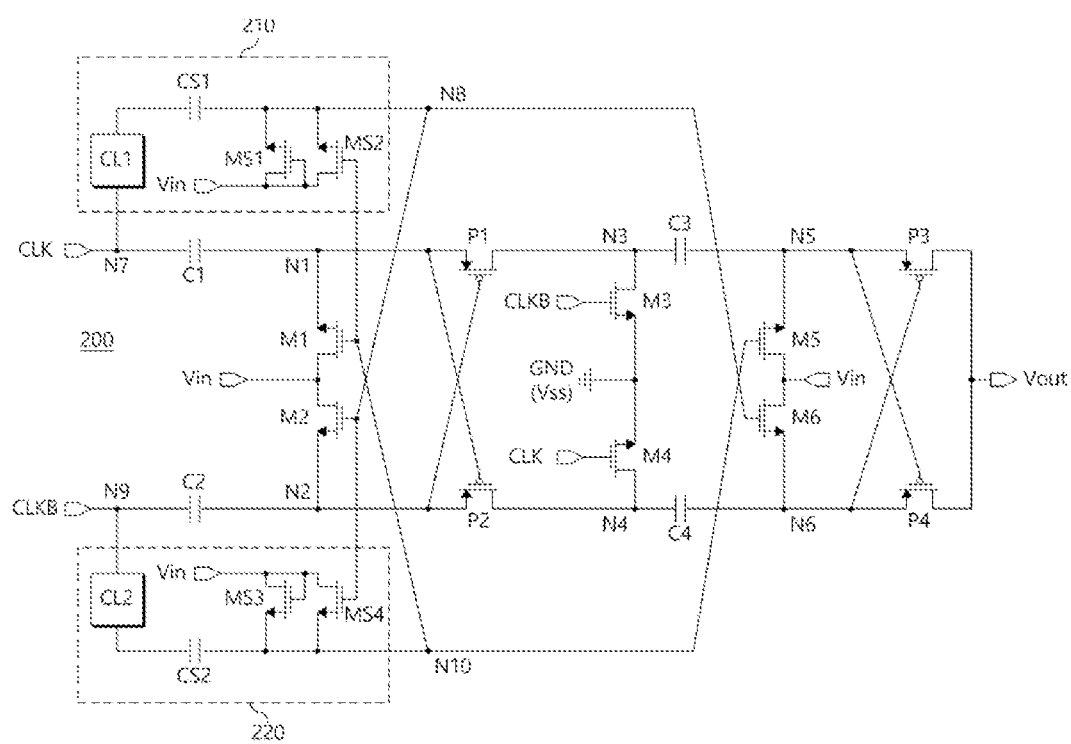
FIG. 8 is a block diagram illustrating a charge pump circuit including a sub-pumping circuit according to some embodiments.

FIG. 8 is a block diagram illustrating a charge pump circuit including a sub-pumping circuit according to some embodiments. Referring to FIG. 8, a charge pump circuit 200 may include all the components of the charge pump circuit 100 of FIG. 4 and may further include a first sub-pumping circuit 210 and a second sub-pumping circuit 220. In the charge pump circuit 200, configurations and characteristics of a first pumping stage (e.g., the first pumping capacitor C1, the second pumping capacitor C2, the first N-type transistor M1, and the second N-type transistor M2), a first transfer stage (e.g., the first P-type transistor P1 and the second P-type transistor P2), a second pumping stage (e.g., the third pumping capacitor C3, the fourth pumping capacitor C4, the third N-type transistor M3, the fourth N-type transistor M4, the fifth N-type transistor M5, and the sixth N-type transistor M6), and a second transfer stage (e.g., the third P-type transistor P3 and the fourth P-type transistor P4) may be identical or similar to those of the first pumping stage 110, the first transfer stage 120, the second pumping stage 130, and the second transfer stage 140 of FIG. 4. Accordingly, some discussion of the configurations and characteristics of the charge pump circuit 200 that corresponds to the previously-provided discussion of configurations and characteristics of the charge pump circuit 100 of FIG. 4 will be omitted here in the interest of brevity and with reference to the previously-provided discussion. The first sub-pumping circuit 210 may be connected between a seventh node N7 and an eighth node N8. The second sub-pumping circuit 220 may be connected between a ninth node N9 and a tenth node N10. The seventh node N7 may be supplied with the clock signal CLK and may be connected with the first end of the first pumping capacitor C1. The ninth node N9 may be supplied with the inverse clock signal CLKB and may be connected with the first end of the second pumping capacitor C2.

According to some embodiments, the first sub-pumping circuit 210 may include first control logic CL1, a first sub-capacitor CS1, a first N-type sub-transistor MS1, and a second N-type sub-transistor MS2. A first end of the first control logic CL1 may be connected with the seventh node N7, and a second end thereof may be connected with the first sub-capacitor CS1. A first end of the first sub-capacitor CS1 may be connected with the first control logic CL1, and a second end thereof may be connected with the eighth node N8. The first N-type sub-transistor MS1 may include a gate and a drain to which the input voltage Vin is applied, and a source connected with the eighth node N8. The second N-type sub-transistor MS2 may include a gate connected with the tenth node N10, a drain to which the input voltage Vin is applied, and a source connected with the eighth node N8. Unlike the charge pump circuit 100 of FIG. 4, the gate of the first N-type transistor M1 and the gate of the fifth N-type transistor M5 may be connected with the tenth node N10.

According to some embodiments, the second sub-pumping circuit 220 may include second control logic CL2, a second sub-capacitor CS2, a third N-type sub-transistor MS3, and a fourth N-type sub-transistor MS4. A first end of the second control logic CL2 may be connected with the ninth node N9, and a second end thereof may be connected with the second sub-capacitor CS2. A first end of the second sub-capacitor CS2 may be connected with the second control logic CL2, and a second end thereof may be connected with the tenth node N10. The third N-type sub-transistor MS3 may include a gate and a drain to which the input voltage Vin is applied, and a source connected with the tenth node N10. The fourth N-type sub-transistor MS4 may include a gate connected with the eighth node N8, a drain to which the input voltage Vin is applied, and a source connected with the tenth node N10. In contrast to the charge pump circuit 100 of FIG. 4, the gate of the second N-type transistor M2 and the gate of the sixth N-type transistor M6 may be connected with the eighth node N8.

According to some embodiments, when the second pumping capacitor C2 and the fourth pumping capacitor C4 operate in the precharge mode, the first sub-pumping circuit 210 may independently control gate voltages of the second N-type transistor M2 and the sixth N-type transistor M6 such that precharge timings of the second node N2 and the sixth node N6 are independently controlled. For example, the first N-type sub-transistor MS1 and the second N-type sub-transistor MS2 may precharge the eighth node N8 with the input voltage Vin. The first control logic CL1 may include a delay circuit. The first control logic CL1 may delay the clock signal CLK and may transfer the delayed clock signal CLK to the first sub-capacitor CS1. When the delayed clock signal CLK is at the high level, the eighth node N8 may increase to two times the input voltage 2Vin. Afterwards, when the inverse clock signal CLKB of the high level is applied to the ninth node N9, gate voltages of the second N-type transistor M2 and the sixth N-type transistor M6 may be maintained at two times the input voltage 2Vin. As such, the first sub-pumping circuit 210 may prevent a reverse peak current from being generated when the operation mode of the second pumping capacitor C2 and the fourth pumping capacitor C4 switches from the precharge mode to the pumping mode. Accordingly, the pumping speed of the charge pump circuit 200 may be improved.

According to some embodiments, when the first pumping capacitor C1 and the third pumping capacitor C3 operate in the precharge mode, the second sub-pumping circuit 220 may independently control gate voltages of the first N-type transistor M1 and the fifth N-type transistor M5 such that precharge timings of the first node N1 and the fifth node N5 are independently controlled. For example, the third N-type sub-transistor MS3 and the fourth N-type sub-transistor MS4 may precharge the tenth node N10 with the input voltage Vin. The second control logic CL2 may include a delay circuit. The second control logic CL2 may delay the inverse clock signal CLKB and may transfer the delayed inverse clock signal CLKB to the second sub-capacitor CS2. When the delayed inverse clock signal CLKB is at the high level, the tenth node N10 may increase to two times the input voltage 2Vin. Afterwards, when the clock signal CLK of the high level is applied to the seventh node N7, gate voltages of the first N-type transistor M1 and the fifth N-type transistor M5 may be maintained at two times the input voltage 2Vin. As such, the second sub-pumping circuit 220 may prevent a reverse peak current from being generated when the operation mode of the first pumping capacitor C1 and the third pumping capacitor C3 switches from the precharge mode to the pumping mode. Accordingly, the pumping speed of the charge pump circuit 200 may be improved.

Figure 9:
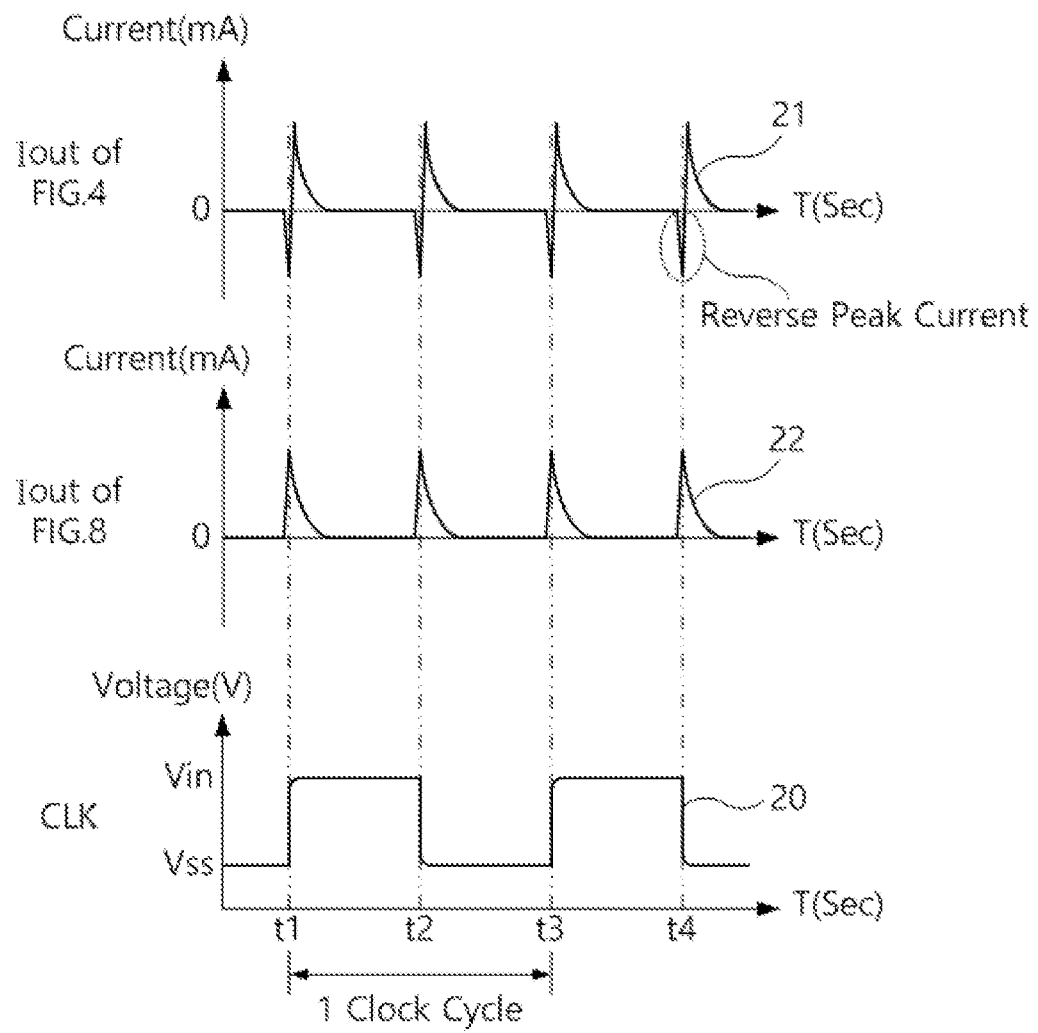
FIG. 9 is a timing diagram illustrating an output current corresponding to an output voltage in a charge pump circuit according to some embodiments.

FIG. 9 is a timing diagram illustrating an output current that corresponds to an output voltage in a charge pump circuit according to some embodiments. Referring to FIG. 9, a clock graph 20 may indicate the clock signal CLK. A first current graph 21 may indicate an output current Iout of FIG. 4 corresponding to the output voltage Vout in the charge pump circuit 100 of FIG. 4. A second current graph 22 may indicate an output current Iout of FIG. 8 corresponding to the output voltage Vout in the charge pump circuit 200 of FIG. 8. One clock cycle of the clock signal CLK may correspond to a time period from a first time point t1 to a third time point t3.

According to some embodiments, in the charge pump circuit 100 of FIG. 4, the state of components in the precharge mode and the state of components in the pumping mode may simultaneously transition at the rising edge or the falling edge of the clock graph 20. As such, referring to the first current graph 21, it may be seen that a reverse peak current may be generated in the output current Iout of FIG. 4 at the rising edge or the falling edge of the clock graph 20. Meanwhile, in the charge pump circuit 200 of FIG. 8, the state transition timing of components in the precharge mode and the state transition timing of components in the pumping mode may be independently controlled through the first sub-pumping circuit 210 and the second sub-pumping circuit 220 such that the state transitions of the components in the precharge mode and the components in the pumping mode are made at different time points. As such, referring to the second current graph 22, it may be seen that a reverse peak current may be avoided in the output current Iout of FIG. 8 at the rising edge or the falling edge of the clock graph 10. Accordingly, compared to the charge pump circuit 100 of FIG. 4, the charge pump circuit 200 of FIG. 8 may prevent the current and voltage loss in the mode switch, and the pumping speed of the charge pump circuit 200 of FIG. 8 may be improved.

Figure 10:
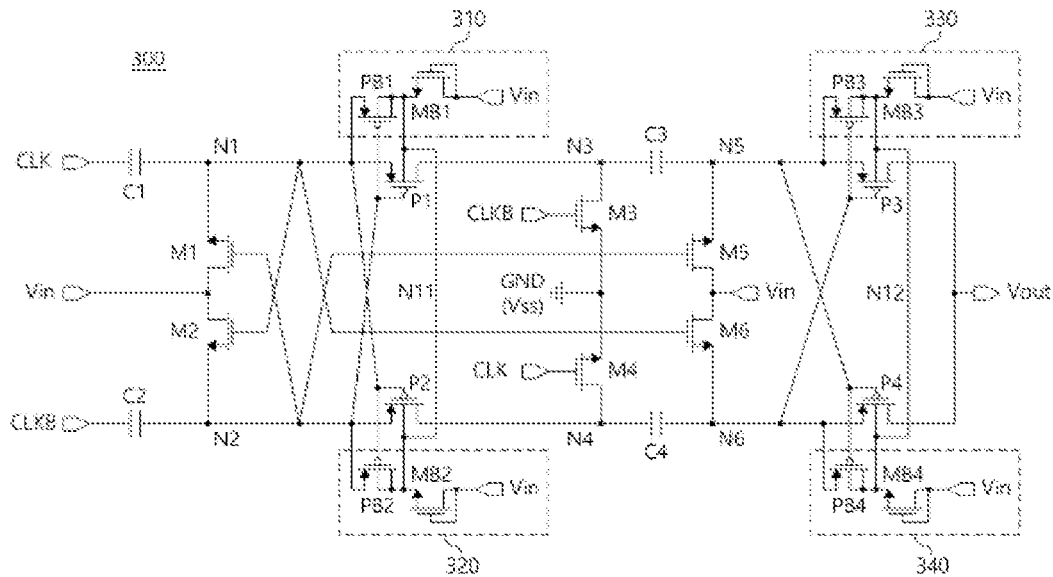
FIG. 10 is a circuit diagram illustrating a charge pump circuit including a body bias circuit assisting a transfer stage, according to some embodiments.

FIG. 10 is a circuit diagram illustrating a charge pump circuit including a body bias circuit assisting a transfer stage, according to some embodiments. Referring to FIG. 10, a charge pump circuit 300 may include all the components of the charge pump circuit 100 of FIG. 4 and may further include a first body bias circuit 310, a second body bias circuit 320, a third body bias circuit 330, and a fourth body bias circuit 340. In the charge pump circuit 300, configurations and characteristics of a first pumping stage (e.g., the first pumping capacitor C1, the second pumping capacitor C2, the first N-type transistor M1, and the second N-type transistor M2), a first transfer stage (e.g., the first P-type transistor P1 and the second P-type transistor P2), a second pumping stage (e.g., the third pumping capacitor C3, the fourth pumping capacitor C4, the third N-type transistor M3, the fourth N-type transistor M4, the fifth N-type transistor M5, and the sixth N-type transistor M6), and a second transfer stage (e.g., the third P-type transistor P3 and the fourth P-type transistor P4) may be identical or similar to those of the first pumping stage 110, the first transfer stage 120, the second pumping stage 130, and the second transfer stage 140 of FIG. 4. Accordingly, some discussion of the configurations and characteristics of the charge pump circuit 300 that corresponds to the previously-provided discussion of configurations and characteristics of the charge pump circuit 100 of FIG. 4 will be omitted here in the interest of brevity and with reference to the previously-provided discussion. The first body bias circuit 310 may be connected between the first node N1 and an eleventh node N11. The second body bias circuit 320 may be connected between the second node N2 and the eleventh node N11. The third body bias circuit 330 may be connected between the fifth node N5 and a twelfth node N12. The fourth body bias circuit 340 may be connected between the sixth node N6 and the twelfth node N12. The eleventh node N11 may be connected with a body of the first P-type transistor P1 and a body of the second P-type transistor P2. The twelfth node N12 may be connected with a body of the third P-type transistor P3 and a body of the fourth P-type transistor P4.

According to some embodiments, the first body bias circuit 310 may include a first P-type body transistor PB1 and a first N-type body transistor MB1. For example, the first P-type body transistor PB1 may include a gate connected with the second node N2, a source connected with the first node N1, and a drain connected with the eleventh node N11. A body of the first P-type body transistor PB1 may be connected with the eleventh node N11. The first N-type body transistor MB1 may include a gate and a drain to which the input voltage Vin is applied, and a source connected with the eleventh node N11.

According to some embodiments, the second body bias circuit 320 may include a second P-type body transistor PB2 and a second N-type body transistor MB2. For example, the second P-type body transistor PB2 may include a gate connected with the first node N1, a source connected with the second node N2, and a drain connected with the eleventh node N11. A body of the second P-type body transistor PB2 may be connected with the eleventh node N11. The second N-type body transistor MB2 may include a gate and a drain to which the input voltage Vin is applied, and a source connected with the eleventh node N11.

According to some embodiments, the third body bias circuit 330 may include a third P-type body transistor PB3 and a third N-type body transistor MB3. For example, the third P-type body transistor PB3 may include a gate connected with the sixth node N6, a source connected with the fifth node N5, and a drain connected with the twelfth node N12. A body of the third P-type body transistor PB3 may be connected with the twelfth node N12. The third N-type body transistor MB3 may include a gate and a drain to which the input voltage Vin is applied, and a source connected with the twelfth node N12.

According to some embodiments, the fourth body bias circuit 340 may include a fourth P-type body transistor PB4 and a fourth N-type body transistor MB4. For example, the fourth P-type body transistor PB4 may include a gate connected with the fifth node N5, a source connected with the sixth node N6, and a drain connected with the twelfth node N12. A body of the fourth P-type body transistor PB4 may be connected with the twelfth node N12. The fourth N-type body transistor MB4 may include a gate and a drain to which the input voltage Vin is applied, and a source connected with the twelfth node N12.

According to some embodiments, the first body bias circuit 310 may supply the input voltage Vin to the body of the first P-type transistor P1. The second body bias circuit 320 may supply the input voltage Vin to the body of the second P-type transistor P2. The third body bias circuit 330 may supply the input voltage Vin to the body of the third P-type transistor P3. The fourth body bias circuit 340 may supply the input voltage Vin to the body of the fourth P-type transistor P4.

According to some embodiments, a sufficient body bias voltage may be supplied to transfer transistors (e.g., the first P-type transistor P1, the second P-type transistor P2, the third P-type transistor P3, and the fourth P-type transistor P4). As such, in the pumping mode, the voltage of the first pumping stage (e.g., the first pumping capacitor C1, the second pumping capacitor C2, the first N-type transistor M1, and the second N-type transistor M2) may be transferred to a second pumping stage (e.g., the third pumping capacitor C3, the fourth pumping capacitor C4, the third N-type transistor M3, the fourth N-type transistor M4, the fifth N-type transistor M5, and the sixth N-type transistor M6) through a first transfer stage (e.g., the first P-type transistor P1 and the second P-type transistor P2) without the loss. Also, the voltage of the second pumping stage may be transferred to the output node through the second transfer stage (e.g., the third P-type transistor P3 and the fourth P-type transistor P4) without the loss.

Figure 11:
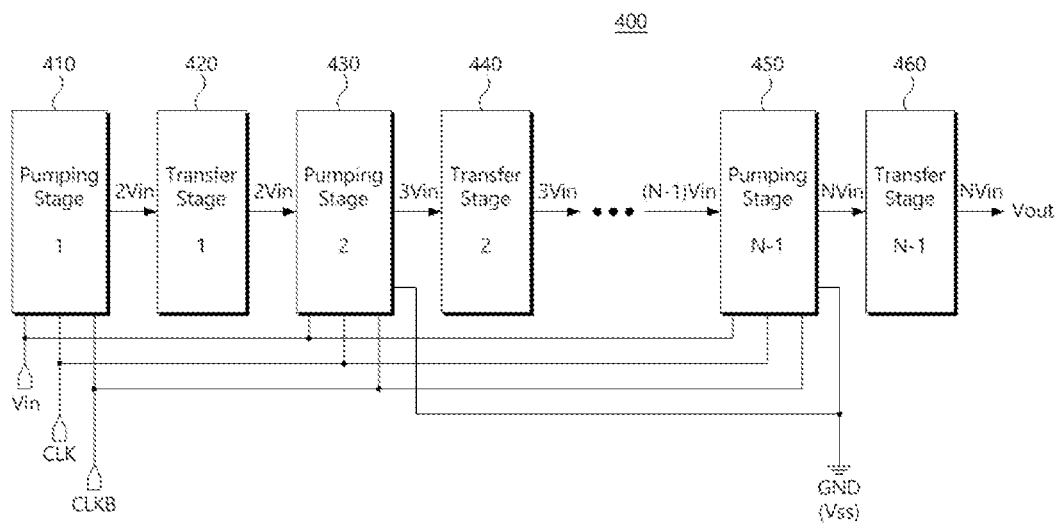
FIG. 11 is a diagram illustrating a charge pump circuit generating an output voltage corresponding to N times an input voltage, according to some embodiments.

FIG. 11 is a diagram illustrating a charge pump circuit generating an output voltage corresponding to N times an input voltage, according to some embodiments. Referring to FIG. 11, a charge pump circuit 400 may generate the output voltage Vout (e.g., NVin) corresponding to N times the input voltage Vin through (N−1) pumping stages (e.g., a first pumping stage 410 to an (N−1)-th pumping stage 450) and (N−1) transfer stages (e.g., a first transfer stage 420 to an (N−1)-th transfer stage 460). The input voltage Vin, the clock signal CLK, and the inverse clock signal CLKB may be applied to each pumping stage. The second pumping stage 430 to the (N−1)-th pumping stage 450 may be connected with the ground node GND.

According to some embodiments, a configuration and characteristics of the first pumping stage 410 may be identical to the configuration and characteristics of the first pumping stage 110 of FIG. 4. A configuration and characteristics of the first transfer stage 420 may be similar to the configuration and characteristics of the first transfer stage 120 of FIG. 4. A configuration and characteristics of the second pumping stage 430 may be similar to the configuration and characteristics of the second pumping stage 130 of FIG. 4. A configuration and characteristics of the second transfer stage 440 may be similar to the configuration and characteristics of the second transfer stage 140 of FIG. 4. A configuration and a characteristic of the (N−1)-th pumping stage 450 may be similar to the configuration and characteristics of the second pumping stage 430. A configuration and characteristics of the (N−1)-th transfer stage 460 may be similar to the configuration and characteristics of the second transfer stage 440. Configurations and characteristics of each of pumping stages between the second pumping stage 430 and the (N−1)-th pumping stage 450 may be similar to the configuration and characteristics of the second pumping stage 430. Configurations and characteristics of each of transfer stages between the second transfer stage 440 and the (N−1)-th transfer stage 460 may be similar to the configuration and characteristics of the second transfer stage 440.

According to some embodiments, the first pumping stage 410 may output a voltage 2Vin corresponding to two times the input voltage Vin to the first transfer stage 420. The first transfer stage 420 may transfer the voltage 2Vin to the second pumping stage 430. The second pumping stage 430 may output a voltage 3Vin corresponding to three times the input voltage Vin to the second transfer stage 440. The second transfer stage 440 may transfer the voltage 3Vin to a next pumping stage. Each of the second pumping stage 430 to the (N−1)-th pumping stage 450 may boost a voltage transferred from a previous transfer stage as much as the input voltage Vin and may output the boosted voltage to a next transfer stage. Each of the second transfer stage 440 to the (N−1)-th transfer stage 460 may transfer a voltage output from a previous pumping stage to a next pumping stage without modification. The (N−1)-th pumping stage 450 may output a voltage NVin corresponding to N times the input voltage Vin to the (N−1)-th transfer stage 460. The (N−1)-th transfer stage 460 may output the voltage NVin corresponding to N times the input voltage Vin to the output node.

According to some embodiments, all the pumping stages and all the transfer stages of the charge pump circuit 400 may simultaneously perform the pumping operations and the transfer operations during one clock cycle. A voltage across each pumping capacitor included in each pumping stage of the charge pump circuit 400 may be smaller than or equal to the input voltage Vin. Accordingly, the degradation of the pumping capacitors included in the charge pump circuit 400 may be prevented or reduced, and the operation speed and reliability of the charge pump circuit 400 may be improved.

According to some embodiments, some of the pumping capacitors included in the charge pump circuit 400 may operate in the pumping mode, and the others thereof may operate in the precharge mode. The pumping capacitors operating in the pumping mode from among the pumping capacitors included in the charge pump circuit 400 may be connected in series.

According to some embodiments, the sub-pumping circuits (e.g., the first sub-pumping circuit 210 and the second sub-pumping circuit 220) of FIG. 8 may be additionally applied to each pumping stage of the charge pump circuit 400. Also, the body bias circuits (e.g., the first body bias circuit 310, the second body bias circuit 320, the third body bias circuit 330, and the fourth body bias circuit 340) of FIG. 10 may be additionally applied to each transfer stage of the charge pump circuit 400.

According to the present disclosure, an output voltage corresponding to multiple times the input voltage may be generated within one clock cycle.

Also, according to the present disclosure, as a voltage across a capacitor used in a pumping stage may be controlled to be smaller than or equal to the input voltage, and as such the degradation of the capacitor may be prevented or reduced and the reliability may be secured or improved.

In addition, according to the present disclosure, there may be provided a charge pump circuit that uses the area smaller than that of a conventional multi-stage boosting circuit, while still being capable of generating an identical output voltage.

While the present disclosure has been described with reference to embodiments thereof, it will be apparent to those of ordinary skill in the art that various changes and modifications may be made thereto without departing from the scope of the present disclosure as set forth in the following claims.

What is claimed is:
1. A charge pump circuit for a semiconductor memory device, the charge pump circuit comprising:
  a first pumping stage including:
    a first pumping capacitor including a first end configured to receive a clock signal and a second end connected with a first node; and a second pumping capacitor including a first end configured to receive an inverse clock signal and a second end connected with a second node;
a first transfer stage configured to transfer a voltage of the first node to a third node when the clock signal is at a high level or to transfer a voltage of the second node to a fourth node when the inverse clock signal is at the high level;
a second pumping stage including:
a third pumping capacitor including a first end connected with the third node and a second end connected with a fifth node; and
a fourth pumping capacitor including a first end connected with the fourth node and a second end connected with a sixth node; and
a second transfer stage configured to transfer a voltage of the fifth node to an output node when the clock signal is at the high level or to transfer a voltage of the sixth node to the output node when the inverse clock signal is at the high level,
wherein, when the clock signal is at the high level, the first pumping capacitor and the third pumping capacitor are electrically connected in series to the output node and output, to the output node, an output voltage that corresponds to multiple times an input voltage applied to the first pumping stage and the second pumping stage, and
wherein, when the inverse clock signal is at the high level, the second pumping capacitor and the fourth pumping capacitor are electrically connected in series to the output node and output, to the output node, the output voltage that corresponds to multiple times the input voltage.

2. The charge pump circuit of claim 1, wherein the first pumping stage further includes:
a first N-type transistor including a gate connected with the second node, a drain configured to receive the input voltage, and a source connected with the first node; and
a second N-type transistor including a gate connected with the first node, a drain configured to receive the input voltage, and a source connected with the second node.

3. The charge pump circuit of claim 2, wherein the second pumping stage further includes:
a third N-type transistor including a gate configured to receive the inverse clock signal, a drain connected with the third node, a source connected with a ground node;
a fourth N-type transistor including a gate configured to receive the clock signal, a drain connected with the fourth node, and a source connected with the ground node;
a fifth N-type transistor including a gate connected with the second node, a drain configured to receive the input voltage, and a source connected with the fifth node; and
a sixth N-type transistor including a gate connected with the first node, a drain configured to receive the input voltage, and a source connected with the sixth node.

4. The charge pump circuit of claim 3, wherein the first transfer stage further includes:
a first P-type transistor including a gate connected with the second node, a source connected with the first node, and a drain connected with the third node; and
a second P-type transistor including a gate connected with the first node, a source connected with the second node, and a drain connected with the fourth node.

5. The charge pump circuit of claim 4, wherein the second transfer stage further includes:
a third P-type transistor including a gate connected with the sixth node, a source connected with the fifth node, and a drain connected with the output node; and
a fourth P-type transistor including a gate connected with the fifth node, a source connected with the sixth node, and a drain connected with the output node.

6. The charge pump circuit of claim 5, wherein, when the clock signal is at the high level and the inverse clock signal is at a low level,
the first pumping capacitor and the third pumping capacitor operate in a pumping mode,
a voltage level of the first node is boosted to a first voltage corresponding to two times the input voltage through the first pumping capacitor,
the first P-type transistor transfers the first voltage to the third node,
a voltage level of the fifth node is boosted to a second voltage corresponding to three times the input voltage through the third pumping capacitor, and
the third P-type transistor transfers the second voltage to the output node.

7. The charge pump circuit of claim 6, wherein, when the clock signal is at the low level and the inverse clock signal is at the high level,
the second pumping capacitor and the fourth pumping capacitor operate in a pumping mode,
a voltage level of the second node is boosted to a first voltage corresponding to two times the input voltage through the second pumping capacitor,
the second P-type transistor transfers the first voltage to the fourth node,
a voltage level of the sixth node is boosted to a second voltage corresponding to three times the input voltage through the fourth pumping capacitor, and
the fourth P-type transistor transfers the second voltage to the output node.

8. The charge pump circuit of claim 5, wherein, when the clock signal is at a low level and the inverse clock signal is at the high level, the first pumping capacitor and the third pumping capacitor operate in a precharge mode,
the first node is precharged with the input voltage through a first N-type transistor,
the third node is precharged with the input voltage through a third N-type transistor, and
the fifth node is precharged with the input voltage through a fifth N-type transistor.

9. The charge pump circuit of claim 5, wherein, when the clock signal is at the high level and the inverse clock signal is at a low level, the second pumping capacitor and the fourth pumping capacitor operate in a precharge mode,
the second node is precharged with the input voltage through a second N-type transistor,
the fourth node is precharged with a ground voltage through a fourth N-type transistor, and
the sixth node is precharged with the input voltage through a sixth N-type transistor.

10. The charge pump circuit of claim 1, wherein the first pumping stage, the first transfer stage, the second pumping stage, and the second transfer stage operate simultaneously during one clock cycle of the clock signal or the inverse clock signal.

11. The charge pump circuit of claim 1, wherein, in a pumping mode or a precharge mode, a voltage difference between opposite ends of each of the first pumping capacitor, the second pumping capacitor, the third pumping capacitor, and the fourth pumping capacitor is maintained to be smaller than or equal to the input voltage in magnitude.

12. A charge pump circuit of a semiconductor memory device, comprising:
a first pumping stage including:
a first pumping capacitor including a first end configured to receive a clock signal and a second end connected with a first node; and
a second pumping capacitor including a first end configured to receive an inverse clock signal and a second end connected with a second node;
a first transfer stage configured to transfer a voltage of the first node to a third node when the clock signal is at a high level or to transfer a voltage of the second node to a fourth node when the inverse clock signal is at the high level;
a second pumping stage including:
a third pumping capacitor including a first end connected with the third node and a second end connected with a fifth node; and
a fourth pumping capacitor including a first end connected with the fourth node and a second end connected with a sixth node;
a second transfer stage configured to transfer a voltage of the fifth node to an output node when the clock signal is at the high level or to transfer a voltage of the sixth node to the output node when the inverse clock signal is at the high level;
a first sub-pumping circuit configured to control a voltage change timing of the second node and the sixth node and a level change timing of the clock signal based on the clock signal; and
a second sub-pumping circuit configured to control a voltage change timing of the first node and the fifth node and a level change timing of the inverse clock signal based on the inverse clock signal,
wherein, when the clock signal is at the high level, the first pumping capacitor and the third pumping capacitor are electrically connected in series to the output node and output, to the output node, an output voltage that corresponds to multiple times an input voltage applied to the first pumping stage and the second pumping stage, and
wherein, when the inverse clock signal is at the high level, the second pumping capacitor and the fourth pumping capacitor are electrically connected in series to the output node and output, to the output node, the output voltage that corresponds to multiple times the input voltage.

13. The charge pump circuit of claim 12, wherein the first pumping stage further includes a first N-type transistor and a second N-type transistor,
wherein the second pumping stage further includes a third N-type transistor, a fourth N-type transistor, a fifth N-type transistor, and a sixth N-type transistor,
wherein the first sub-pumping circuit includes a first control logic, a first sub-capacitor, a first N-type sub-transistor, and a second N-type sub-transistor,
wherein the second sub-pumping circuit includes a second control logic, a second sub-capacitor, a third N-type sub-transistor, and a fourth N-type sub-transistor,
wherein a source of the first N-type transistor is connected with the first node,
wherein a source of the second N-type transistor is connected with the second node,
wherein a drain of the third N-type transistor is connected with the third node,
wherein a drain of the fourth N-type transistor is connected with the fourth node,
wherein a source of the fifth N-type transistor is connected with the fifth node,
wherein a source of the sixth N-type transistor is connected with the sixth node,
wherein a first end of the first control logic is connected with a seventh node,
wherein a gate of the second N-type transistor, a gate of the sixth N-type transistor, a first end of the first sub-capacitor, a source of the first N-type sub-transistor, a source of the second N-type sub-transistor, and a gate of the fourth N-type sub-transistor are connected with an eighth node,
wherein a first end of the second control logic is connected with a ninth node,
wherein a gate of the first N-type transistor, a gate of the fifth N-type transistor, a first end of the second sub-capacitor, a source of the third N-type sub-transistor, a source of the fourth N-type sub-transistor, and a gate of the second N-type sub-transistor are connected with a tenth node,
wherein a second end of the first control logic is connected with a second end of the first sub-capacitor,
wherein a second end of the second control logic is connected with a second end of the second sub-capacitor,
wherein a source of the third N-type transistor and a source of the fourth N-type transistor are connected with a ground node, and
wherein the input voltage is applied to a drain of the first N-type transistor, a drain of the second N-type transistor, a drain of the fifth N-type transistor, and a drain of the sixth N-type transistor.

14. The charge pump circuit of claim 13, wherein the first control logic is configured to delay the clock signal and is configured to output the delayed clock signal to the first sub-capacitor, and
wherein the second control logic is configured to delay the inverse clock signal and is configured to output the delayed inverse clock signal to the second sub-capacitor.

15. The charge pump circuit of claim 13, wherein, in a precharge mode, the first sub-pumping circuit is configured to control the second N-type transistor and the sixth N-type transistor such that potentials of the second node and the sixth node are maintained independently of the inverse clock signal.

16. The charge pump circuit of claim 13, wherein the first sub-pumping circuit is configured to control the second N-type transistor and the sixth N-type transistor such that potential of the second node and the sixth node are maintained at the input voltage to be different from a timing at which the second pumping capacitor and the fourth pumping capacitor switches from a precharge mode to a pumping mode.

17. The charge pump circuit of claim 13, wherein, in a precharge mode, the second sub-pumping circuit is configured to control the first N-type transistor and the fifth N-type transistor such that potentials of the first node and the fifth node are maintained independently of the clock signal.

18. The charge pump circuit of claim 13, wherein the second sub-pumping circuit is configured to control the first N-type transistor and the fifth N-type transistor such that potential of the first node and the fifth node are maintained at the input voltage to be different from a timing at which the first pumping capacitor and the third pumping capacitor switches from a precharge mode to a pumping mode.

19. A semiconductor memory device comprising:

a memory cell array including a plurality of memory cells;

a peripheral circuit configured to receive a clock signal, a first power supply voltage, and a second power supply voltage that is higher than the first power supply voltage from a source external to the peripheral circuit, and further configured to read/write data from/in the memory cell array based on the clock signal, the first power supply voltage, and the second power supply voltage; and a charge pump circuit configured to generate an internal voltage corresponding to multiple times the second power supply voltage, wherein the charge pump circuit includes:

a first pumping stage including:
- a first pumping capacitor including a first end configured to receive the clock signal and a second end connected with a first node; and
- a second pumping capacitor including a first end configured to receive an inverse clock signal generated by the peripheral circuit and a second end connected with a second node;

a first transfer stage configured to transfer a voltage of the first node to a third node when the clock signal is at a high level or to transfer a voltage of the second node to a fourth node when the inverse clock signal is at the high level;

a second pumping stage including:
- a third pumping capacitor including a first end connected with the third node and a second end connected with a fifth node; and
- a fourth pumping capacitor including a first end connected with the fourth node and a second end connected with a sixth node; and a second transfer stage configured to transfer a voltage of the fifth node to an output node when the clock signal is at the high level or to transfer a voltage of the sixth node to the output node when the inverse clock signal is at the high level, wherein, when the clock signal is at the high level, the first pumping capacitor and the third pumping capacitor are electrically connected in series to the output node and output, to the output node, an output voltage that corresponds to multiple times the second power supply voltage applied to the first pumping stage and the second pumping stage, and wherein, when the inverse clock signal is at the high level, the second pumping capacitor and the fourth pumping capacitor are electrically connected in series to the output node and output, to the output node, the output voltage that corresponds to multiple times the second power supply voltage.

20. The semiconductor memory device of claim 19, wherein the peripheral circuit includes:

an address decoder configured to provide the memory cell array with a word line enable voltage used to select a word line;

an input/output circuit connected with the memory cell array through bit lines, and configured to input the data to the memory cell array through the bit lines or to output the data transferred through the bit lines to an external destination; and control logic configured to provide the clock signal and the second power supply voltage to the charge pump circuit, to generate the inverse clock signal, and to control the address decoder and the input/output circuit such that the data are input to the memory cell array or the data are output to the external destination, wherein the control logic controls the charge pump circuit such that the word line enable voltage corresponding to multiple times the second power supply voltage is generated for each operation mode.

* * * * *